US006557415B2

United States Patent
Stewart et al.

(10) Patent No.: US 6,557,415 B2
(45) Date of Patent: May 6, 2003

(54) COUNTERBALANCED SILICON TUNED MULTIPLE ACCELEROMETER-GYRO

(75) Inventors: Robert E. Stewart, Woodland Hills, CA (US); Stanley F. Wyse, Encino, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 0 days.

(21) Appl. No.: 10/198,971

(22) Filed: Jul. 19, 2002

(65) Prior Publication Data

US 2003/0024313 A1 Feb. 6, 2003

Related U.S. Application Data

(62) Division of application No. 09/864,598, filed on May 24, 2001, now Pat. No. 6,474,160.

(51) Int. Cl.$^7$ ................................................ G01C 19/00
(52) U.S. Cl. ................................................... 73/504.04
(58) Field of Search ..................... 73/504.02, 504.03, 73/504.04, 504.12

(56) References Cited

U.S. PATENT DOCUMENTS 5,594,170 A * 1/1997 Peters ..................... 73/514.29

* cited by examiner

Primary Examiner—Richard A. Moller

(57) ABSTRACT

A simplified and smaller accelerometer-gyro is provided by combining gyro and accelerometer functions in a single sensor unit which has a pair of counter oscillating accelerometers each having a pendulum or sense element and a vibrating element. The pendulum and vibrating element of each accelerometer are designed to be symmetrical so that the center of mass for each accelerometer are on a line which is parallel to the dither motion of the unit. The geometry of these two pendulums is configured so that the centers of percussion of each is at the same point. Electrodes on the top and bottom cover of the sensor unit combine the pickoff and forcing function with the pendulum tuning function, thereby simplifying electrical connection. A pair of mounting tabs are fastened to the frame by respective compliant beams. The accelerometer-gyro may be mounted in an enclosure that maintains a pressure below atmospheric around the accelerometer-gyro.

14 Claims, 2 Drawing Sheets

COUNTERBALANCED SILICON TUNED MULTIPLE ACCELEROMETER-GYRO

CROSS REFERENCE TO RELATED APPLICATIONS

This application is a divisional of application Ser. No. 09/864,598 filed May 24, 2001 now U.S. Pat. No. 6,474,160 for Counterbalanced Silicon Tuned Multiple Accelerometer-Gyro.

BACKGROUND OF THE INVENTION

1. Field of the Invention

The present invention relates to an inertial instrument and more specifically pertains to single axis and multi-axis vibrating accelerometers used as multi-sensors for measuring linear acceleration and rate of rotation of a moving body.

2. Description of Prior Art

Gyroscopes are well known for use as angular velocity acceleration sensors for sensing angular velocity and acceleration which information is necessary for determining location, direction, position and velocity of a moving vehicle. There are gyroscopes of various types. Vibration type gyroscopes have attracted considerable attention from the standpoint of their low cost and high reliability.

Vibrating structures have exhibited challenging problems, however. Attempts to overcome these problems have produced improved accelerometer gyroscopes. One example is shown in U.S. Pat. No. 4,679,434 granted Jul. 14, 1987 for an Integrated Force Balanced Accelerometer to the same inventor as the present application. The entire disclosure thereof is incorporated herein by reference. Another example which produces a micromachined accelerometer gyroscope by use of a substantially planar body can be found in U.S. Pat. No. 5,392,650 granted Feb. 28, 1995 for a Micromachined Accelerometer Gyroscope.

SUMMARY OF THE INVENTION

In the present invention, gyro and accelerometer functions are combined in a single sensor unit which has a pair of counter oscillating accelerometers, each having a pendulum and vibrating element. The pendulum and vibrating element of each accelerometer are designed symmetrically so that the centers of mass for each are on a line which is parallel to the dither motion of the unit. The geometry of the two pendulums is configured so that the center of percussion of each is at the same point by providing interlaced pendulums with separate vibrating structures mounted on the same frame. The top and bottom covers have electrodes that work with areas defined by grooves or slots formed in the pendulum and vibrating elements to combine the pick-off and forcing functions with the pendulum tuning function. The frame of the sensor includes a pair of mounting tabs which are connected to the frame by respective compliant beams. Those compliant beams serve to lock together the dither frequency of the two vibrating driven elements and at the same time relieve stress imposed on the gyro due to differential thermal expansion between the gyro and its enclosure.

BRIEF DESCRIPTION OF THE DRAWINGS

The exact nature of this invention as well as its objects and advantages will become readily apparent from consideration of the following specification in relation to the accompanying drawings in which like reference numerals designate like parts throughout the figures thereof and wherein.

DESCRIPTION OF THE PREFERRED EMBODIMENT

An accelerometer or gyro disclosed in an application for Phase Insensitive Quadrature Error Nulling Method And Apparatus For Coriolis Angular Rate Sensors having U.S. patent application Ser. No. 09/915,026 filed on May 2, 2002, naming the same inventors as named herein and assigned to the same assignee as the present application, illustrates a method and structure for nulling quadrature error. This method finds application in the present invention. The entire disclosure thereof is incorporated herein by reference as if fully set forth herein.

The silicon tuned accelerometer and/or gyro of the present invention is based on the sensing and measuring of Coriolis induced accelerations acting on a vibrating accelerometer undergoing rotation as a means for measuring angular rotation rates.

The gyro of the present invention measures angular rate by sensing the alternating Coriolis acceleration at the dither frequency which is in phase with the dither velocity and acts on the two pendulums of the counter-oscillating tuned accelerometers (sense elements). The difference in the coriolis acceleration sensed by the two pendulums is a measure of angular rate. The accelerometers measure linear acceleration by sensing the change in the magnitude of the sum of the quadrature signals between the two tuned accelerometers. In this design of the present invention, the normally unused quadrature signals are modulated by the acceleration acting along the input axis of the tuned accelerometers. This modulation occurs as a result of the pendulums of the tuned accelerometers deflecting open loop out of the plane in response to acceleration. As a result, the accelerometer's input axis senses components of the dither acceleration, resulting in quadrature signals. The difference of the quadrature signals remains a measure of the dither amplitude and can be used to maintain the dither amplitude and thereby provide a stable scale factor.

By utilizing the phase insensitive quadrature nulling method as described in application Ser. No. 09/915,026, a d.c. voltage is utilized to servo the quadrature error signal to null. The quadrature signal is utilized for the measurement of acceleration. The approach of the present invention in combining the gyro and accelerometer functions in a single sensor significantly simplifies the implementation of an inertial measurement unit (IMU) and consequently results in reduced costs and size. The cost reduction is the result of eliminating three accelerometers and their associated servo electronics.

Figure 1:
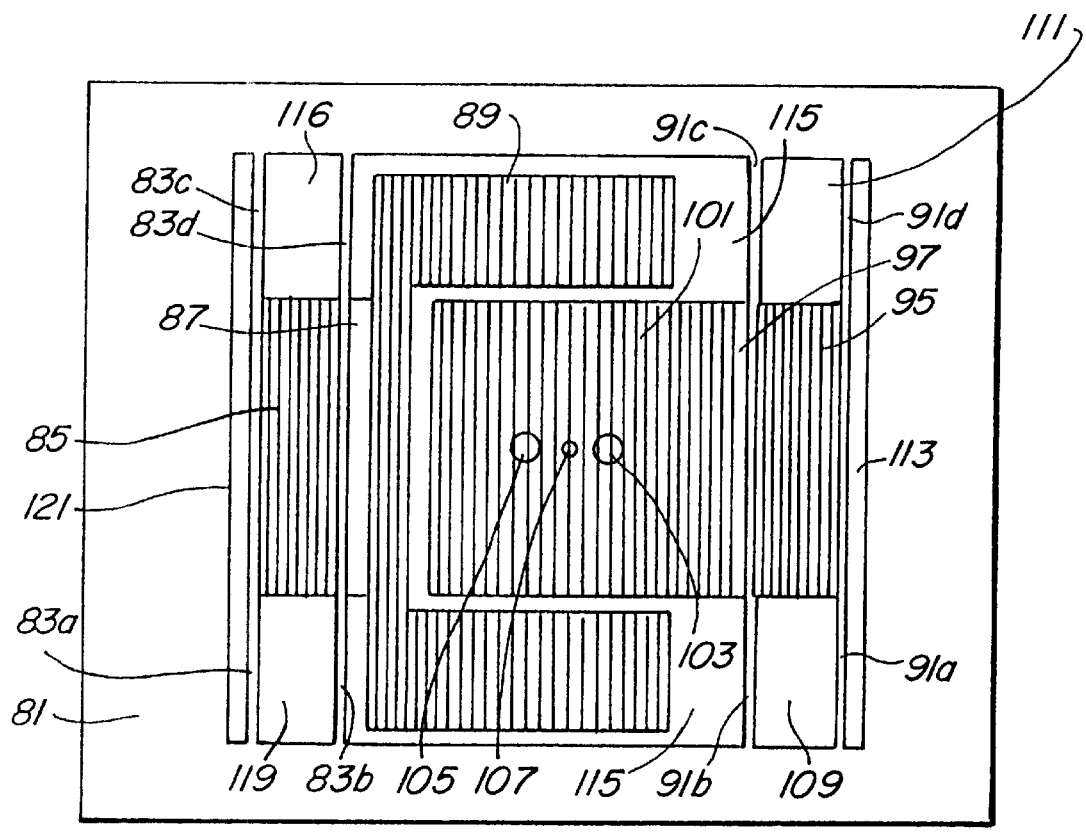
FIG. 1 is a top plan view of the driven and sensing element of an accelerometer-gyro according to the present invention.

FIG. 1 is an illustrative sketch of the sensor portion of the accelerometer gyro of the present invention. This sensor portion is made up of a frame 81 from which is suspended a first vibratory device 85 by way of a plurality, and preferably four dither suspensions 83a, 83b, 83c and 83d. A first sensing element or pendulum mass 89 is suspended from the first vibratory element 85 by way of a sense flexure 87.

A second vibratory element 95 is suspended from frame 81 by four dither suspensions 91a, 91b, 91c and 91d. A second pendulum mass 101 is suspended from the vibratory element 95 by a pendulum flexure 97.

This entire structure is formed out of a single wafer by etching out segments, such as segment 116, 119 and 121 around the first vibratory structure 85. Segments 109, 111 and 113 are etched out around the second vibratory structure 95. Major segment 115 is etched out around the first pendulum 89 and the second pendulum 101.

Accordingly, the first vibratory structure 85 and the second vibratory structure 95 move in the plane of the paper at their driven resonant frequency, whereas the first pendulum 89 and the second pendulum 101 oscillate about their respective flexure connections 87 and 97 in a direction perpendicular to the motion of the vibratory structures 85 and 95 when subjected to either angular rate or acceleration. The pendulums are servoed to null.

As a result of design, the symmetry of the first vibrating structure 85 and the first pendulum 89 and the second vibrating structure 95 and its pendulum 101 have a symmetry which places the center of mass, or center of gravity, 105 of the first vibratory structure and pendulum and the center of mass, or center of gravity, 103 of the second vibratory structure and pendulum in a line which is parallel to the dither motion or vibration of the first vibratory structure 85 and the second vibratory structure 95. This produces counterbalanced operation. In addition, the geometry of the first pendulum 89 and the second pendulum 101 is configured to cause the respective centers of percussion of the first pendulum 89 and the second pendulum 101 to be coincident at the center of percussion 107. This is obtained by, among other things, adjusting the length of the pendulums 89 and 101. This coincidence of the centers of percussion of the two pendulums or sense elements 89 and 101 results in insensitivity to angular vibration during operation.

Figure 2:
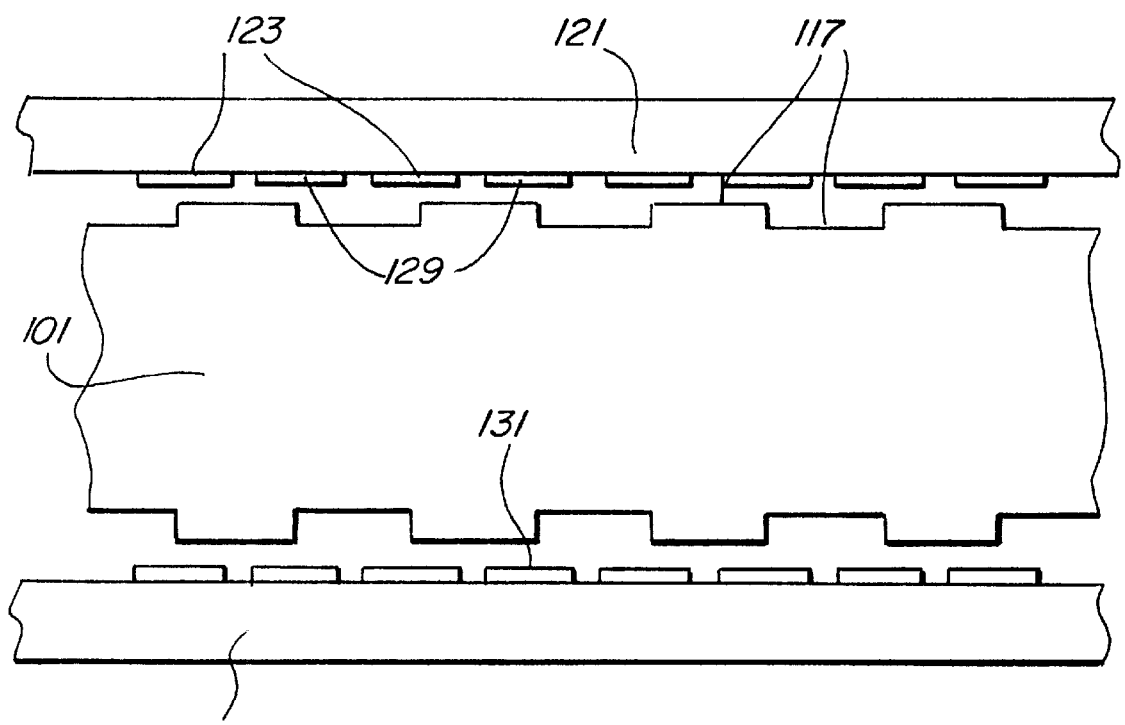
FIG. 2 is a cross-section of a sensor in FIG. 3 showing a portion of a pendulum and the top and bottom covers.

The surfaces of the vibratory structures 85, 95 and the two pendulums 89 and 101, are slotted 117 in a manner more clearly illustrated in FIG. 2 for the purpose of interacting with metalized electrode patterns 129 and 123 on the inside of the top cover 121 and bottom cover 125.

FIG. 2 is a cross-section of a portion of the structure of FIG. 1 showing a portion of pendulum 101 interacting with top and bottom covers 121 and 125 having electrode patterns 123, 129 and 131 thereon.

Figure 3:
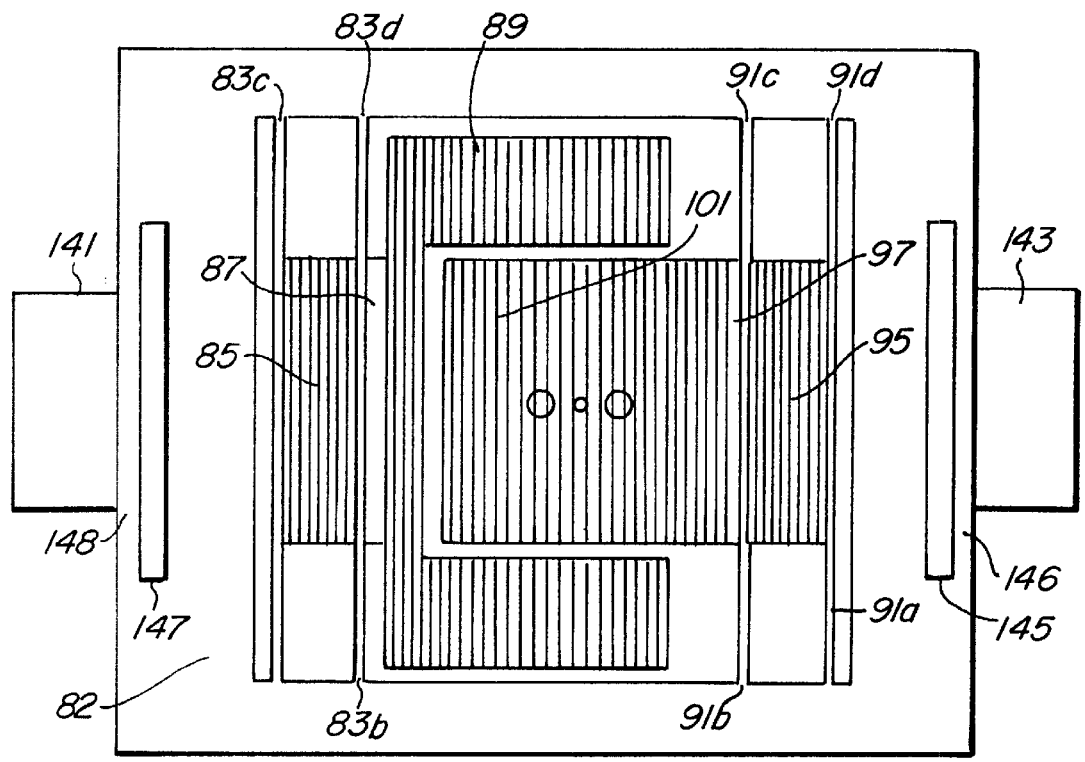
FIG. 3 is a top plan view of an alternate embodiment of the accelerometer-gyro according to the present invention.

Referring now to FIG. 3 which illustrates an alternative preferred embodiment of the accelerometer-gyro of the present invention, wherein the frame 82 for the accelerometer-gyro has a pair of mounting tabs 141, 143 on the sides of the frame that coincide with the dither suspensions 83a–83d, and 91a–91d for the vibrating driven devices 85 and 95. The mounting tabs 141 and 143 are connected to the frame by compliance beams 146 and 148, respectively. These beams may be formed in the frame 82 for example, by etching out slots 145 and 147 of appropriate length and width, next to the respective edges of the frame to which the mounting tabs 141 and 143 are attached.

The mounting tabs 141 and 143 serve to mount the accelerometer-gyro structure in an enclosure, of a type illustrated in FIG. 6 for example. The vibratory structures and pendulums of the accelerometer-gyro within the frame 82 is thus mounted to the enclosure 153 through the two compliant beams 146 and 148. These compliant beams serve two important functions. The first, is to provide a compliance suspension for the accelerometer-gyro which facilitates locking together of the dither frequency of the two driven vibratory elements 85 and 95. The second, is to provide compliance in the mounting, thereby reducing the stress imposed on the accelerometer-gyro due to differential thermal expansion between the enclosure 153 and the accelerometer-gyro and its frame 82.

Figure 4:
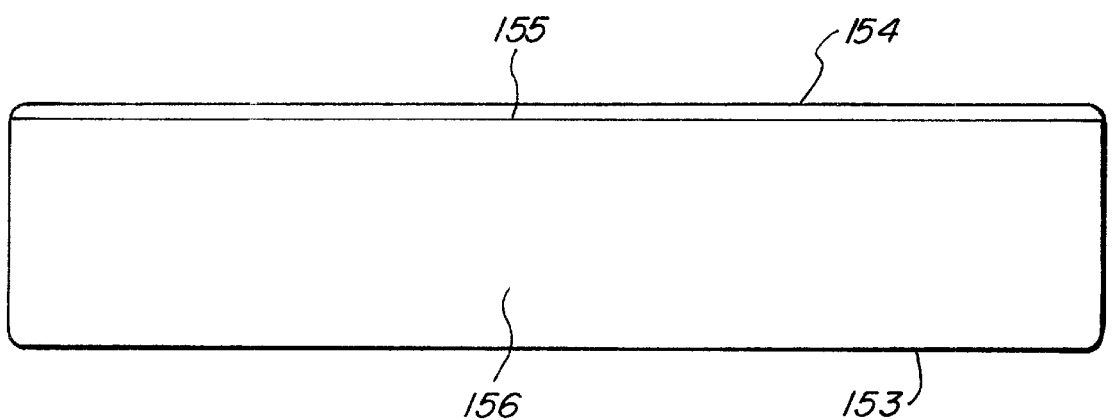
FIG. 4 is a side plan view of an enclosure for the accelerometer-gyro of the present invention.

The enclosure 153 (FIG. 4) has a top 154 and a bottom 156 which are attached together in a well-known sealing relationship after the accelerometer-gyro is mounted therein. The enclosure maintains an atmosphere which is at a reduced pressure from atmospheric. The accelerometer-gyro in the reduced pressure atmosphere of enclosure 153 experiences reduced damping of the driven elements 85, 95 and sensing elements 89 and 101 of the accelerometer-gyro. Reduced damping allows the resonant frequencies of the vibrating driven elements and the pendulum or sensing elements to have higher Qs. It is desirable to have the Q of the vibratory driven elements high in order to reduce the force required to maintain the velocity of the vibratory driven element and therefore maintain a constant gyro scale factor. Qs of 10,000 or greater, for example, are desirable. Maintaining the Q of the sensing elements or pendulums 89, 101 at 100 or greater is also desirable because this reduces the angle random walk by $$\frac{1}{\sqrt{Q}}.$$

What is claimed is:

1. An accelerometer-gyro for sensing angular rates and acceleration formed from a substantially planar monolithic material having first and second major surfaces, the accelerometer-gyro comprising:

a frame defined within the first and second major surfaces;

a plurality of mounting tabs attached to the frame by respective compliant beams;

a vibrating structure having a top, bottom and sides disposed within said frame and connected to said frame by a flexure; and a pendulum having a top and bottom disposed within said frame and connected to said vibrating structure by a flexure.

2. The accelerometer-gyro of claim 1 further comprising an enclosure for the accelerometer-gyro for maintaining the pressure around the accelerometer-gyro below atmospheric.

3. The accelerometer-gyro of claim 1 wherein said vibrating structure is slotted or grooved on its top and bottom surfaces.

4. The accelerometer-gyro of claim 1 wherein the pendulum is slotted or grooved on its top and bottom surfaces.

5. The accelerometer-gyro of claim 4 further comprising:

a top cover having a plurality of electrode patterns on the underside thereof facing the pendulum within the frame.

6. The accelerometer-gyro of claim 5 wherein a pair of electrodes on the top cover overlay peaks or valleys in the top surface of the pendulum.

7. The accelerometer-gyro of claim 5 further comprising a bottom cover having a plurality of electrode patterns on the underside thereof facing the pendulum within the frame; and wherein a pair of electrodes on the bottom cover overlay peaks or valleys in the bottom surface of the pendulum.

8. An accelerometer-gyro for sensing angular rate and acceleration formed from a substantially planar monolithic material having first and second major surfaces, the accelerometer-gyro comprising:

a frame defined within the first and second major surfaces;

a vibrating structure having a top, bottom and sides disposed with said frame and connected to said frame;

a pendulum having a top and bottom disposed with said frame and connected to said vibrating structure; and an enclosure for the accelerometer-gyro for maintaining the pressure around the accelerometer-gyro below atmospheric.

9. The accelerometer-gyro of claim 8 wherein said vibrating structure is connected to said frame by a plurality of flexures.

10. The accelerometer-gyro of claim 8 wherein the pendulum is slotted or grooved on its respective top and bottom surfaces.

11. The accelerometer-gyro of claim 8 further comprising:

a top cover having a plurality of electrode patterns on the underside thereof facing the vibrating structures and pendulums within the frame; and a bottom cover having a plurality of electrode patterns on the underside thereof facing the vibrating structures and pendulums within the frame.

12. The accelerometer-gyro of claim 11 wherein a pair of electrodes on the top cover overlay peaks or valleys in the top surface of the pendulum.

13. The accelerometer-gyro of claim 11 wherein a pair of electrodes on the bottom cover overlay peaks or valleys in the bottom surface of the pendulum.

14. The accelerometer-gyro of claim 8 comprising a plurality of mounting tabs attached to the frame by respective compliant beams.

* * * * *